US008862408B2

(12) United States Patent
Vassallo et al.

(10) Patent No.: US 8,862,408 B2
(45) Date of Patent: Oct. 14, 2014

(54) DETERMINING ONE OR MORE TARGET POSITIONS IN AN ACQUISITION DOMAIN FOR PROCESSING SURVEY DATA

(75) Inventors: Massimiliano Vassallo, Brighton (GB); Dirk-Jan Van Manen, Surrey (GB); Ralf G. Ferber, West Sussex (GB)

(73) Assignee: WesternGeco L.L.C., Houston, TX (US)

( * ) Notice: Subject to any disclaimer, the term of this patent is extended or adjusted under 35 U.S.C. 154(b) by 422 days.

(21) Appl. No.: 13/247,494

(22) Filed: Sep. 28, 2011

(65) Prior Publication Data

US 2013/0080067 A1 Mar. 28, 2013

(51) Int. Cl.
| | | |
|---|---|---|
| *G06F 19/00* | (2011.01) | |
| *G01V 1/00* | (2006.01) | |
| *G01V 1/34* | (2006.01) | |
| *G01V 1/32* | (2006.01) | |
| *G06F 9/00* | (2006.01) | |
| *G01V 1/16* | (2006.01) | |
| *G01V 1/24* | (2006.01) | |

(52) U.S. Cl.
CPC *G01V 1/003* (2013.01); *G01V 1/34* (2013.01); *G01V 1/32* (2013.01); *G06F 9/00* (2013.01); *G01V 1/16* (2013.01); *G01V 1/24* (2013.01)
USPC ........... 702/16; 702/14; 367/21; 367/24; 367/31; 703/6

(58) Field of Classification Search
CPC ... G01V 2210/63; G01V 1/28; G01V 1/3808; G01V 1/003; G01V 1/34; G01V 1/00; G01V 2210/66; G01V 1/32; G01V 1/301; G01V 1/288; G01V 1/22; G01V 1/02; G01V 19/00; G01V 1/16; G01V 1/24; G06F 19/00
USPC ................. 702/16; 703/6; 367/21, 24, 31
See application file for complete search history.

(56) References Cited

U.S. PATENT DOCUMENTS

| | | | | |
|---|---|---|---|---|
| 4,692,909 A | * | 9/1987 | Gard et al. ................. | 367/45 |
| 5,784,335 A | * | 7/1998 | Deplante et al. ............ | 367/72 |
| 7,383,133 B1 | * | 6/2008 | Scott ........................... | 702/16 |
| 7,751,277 B2 | * | 7/2010 | Schonewille ............... | 367/38 |
| 7,817,495 B2 | | 10/2010 | Ozbek et al. | |
| 7,970,546 B1 | * | 6/2011 | Peng ........................... | 702/16 |
| 8,094,513 B2 | * | 1/2012 | Keers et al. ................. | 367/19 |

(Continued)

FOREIGN PATENT DOCUMENTS

| | | |
|---|---|---|
| EP | 869375 A2 * | 10/1998 |
| EP | 2103959 A2 | 9/2009 |
| EP | 2166379 A2 | 3/2010 |

OTHER PUBLICATIONS

International Search Report and Writtten Opinion of PCT Application No. PCT/US2012/054118 dated Dec. 13, 2012: pp. 1-6.

(Continued)

*Primary Examiner* — Carol S Tsai

(57) ABSTRACT

In response to at least one input criterion, one or more target positions in an acquisition domain are determined for processing of survey data, where the survey data is acquired by survey equipment in the acquisition domain having a first set of dimensions, and where the processing of the survey data is to be performed in a processing domain having a second set of dimensions different from the first set of dimensions.

21 Claims, 2 Drawing Sheets

(56) References Cited

U.S. PATENT DOCUMENTS

| | | | |
|---|---|---|---|
| 8,346,695 B2* | 1/2013 | Pepper et al. | 706/45 |
| 8,447,524 B2* | 5/2013 | Chen et al. | 702/16 |
| 8,553,491 B2* | 10/2013 | Gratacos | 367/24 |
| 2004/0068377 A1 | 4/2004 | Charron | |
| 2008/0243749 A1* | 10/2008 | Pepper et al. | 706/47 |
| 2009/0016158 A1* | 1/2009 | Gratacos | 367/21 |
| 2009/0245019 A1* | 10/2009 | Falkenberg et al. | 367/17 |
| 2009/0279386 A1* | 11/2009 | Monk | 367/21 |
| 2009/0296519 A1* | 12/2009 | Keers et al. | 367/19 |
| 2010/0002541 A1 | 1/2010 | Ozdemir et al. | |
| 2010/0149917 A1* | 6/2010 | Imhof et al. | 367/53 |
| 2010/0171740 A1* | 7/2010 | Andersen et al. | 345/424 |
| 2010/0211321 A1 | 8/2010 | Ozdemir et al. | |
| 2010/0211323 A1 | 8/2010 | Ozdemir et al. | |
| 2011/0002192 A1 | 1/2011 | Ozbek et al. | |
| 2011/0038227 A1 | 2/2011 | Kostov et al. | |
| 2011/0276273 A1* | 11/2011 | Artman et al. | 702/16 |
| 2012/0016592 A1* | 1/2012 | Artman et al. | 702/16 |
| 2012/0215506 A1* | 8/2012 | Rickett et al. | 703/6 |
| 2013/0114375 A1* | 5/2013 | Meier et al. | 367/21 |

OTHER PUBLICATIONS

Ozbek et al., "Interpolation by matching pursuit," SEG Houston International Exposition and Annual Meeting, 2009: pp. 3254-3258.

Ozdemir et al., "On data-independent multicomponent interpolators and the use of priors for optimal reconstruction and 3D up/down separation of pressure wavefields," SEG Denver Annual Meeting, 2010: pp. 3584-3588.

* cited by examiner

DETERMINING ONE OR MORE TARGET POSITIONS IN AN ACQUISITION DOMAIN FOR PROCESSING SURVEY DATA

BACKGROUND

Survey data can be collected and processed to produce a representation (image) of a subterranean structure. Survey data can include seismic survey data, as an example. To collect seismic survey data, one or more seismic sources are used to produce seismic waves that are propagated into the subterranean structure, where part of the seismic waves are reflected from the subterranean structure and detected by seismic receivers.

Survey receivers (e.g., seismic receivers) are typically arranged in a predefined geometry (such as an array of survey sensors). Ideal surveys are usually not possible in practice, for both economic and technical reasons. As a result, a representation of a subterranean structure produced from survey data may contain significant errors.

SUMMARY

In general, according to some embodiments, a method includes determining, in response to at least one input criterion, one or more target positions in an acquisition domain for processing of survey data acquired by survey equipment in the acquisition domain having a first set of dimensions. The survey data is processed to produce processed survey data corresponding to the one or more target positions in the acquisition domain. The processed survey data is processed in a processing domain workflow having a second set of dimensions different from the first set of dimensions.

In general, according to further embodiments, a system includes a storage medium to store survey data collected by survey equipment wherein the survey data is associated with a first set of dimensions. At least one processor is to receive at least one input criterion relating to dimensions of a second set that is different from the first set, process the survey data according to the received at least one input criterion to produce processed data, and use the processed data by a workflow in a second set of dimensions to produce a representation of a subterranean structure.

In general, according to yet further embodiments, a method includes receiving at least one input criterion; and determining, in response to the at least one input criterion, one or more target positions in an acquisition domain for processing of survey data, wherein the survey data is acquired by survey equipment in the acquisition domain having a first set of dimensions, and wherein the processing of the survey data is to be performed in a processing domain having a second set of dimensions different from the first set of dimensions.

In further or alternative implementations, the first set of dimensions in the acquisition domain includes one or more dimensions corresponding to coordinates of one or both of at least one survey source and at least one survey receiver of the survey equipment.

In further or alternative implementations, the coordinates include in-line coordinates and cross-line coordinates.

In further or alternative implementations, the coordinates include x coordinates and y coordinates, the x coordinates defined along a first direction and the y coordinates defined along a second direction, wherein the first and second directions are generally perpendicular to each other.

In further or alternative implementations, the second set of dimensions in the processing domain include one or more of the dimensions selected from the group consisting of midpoint, offset, and azimuth dimensions.

In further or alternative implementations, the second set of dimensions in the processing domain include one or more of the dimensions selected from the group consisting of midpoint, offset, and azimuth dimensions.

In further or alternative implementations, determining the one or more target positions comprises determining at least one target position associated with one or more of dimensions selected from the group consisting of offsets or azimuths in the processing domain.

In further or alternative implementations, the at least one input criterion relates to dimensions in the second set, where the at least one input criterion includes a privilege indicia.

In further or alternative implementations, respective weights are associated with corresponding ones of the dimensions in the second set according to the privilege indicia In further or alternative implementations, the survey data is de-aliased.

In further or alternative implementations, de-aliasing the survey data comprises applying an interpolation technique to the received survey data.

In further or alternative implementations, processing the survey data comprises interpolating the survey data to produce interpolated survey data, where processing the processed survey data in the processing domain workflow comprises processing the interpolated survey data by an imaging workflow.

In further or alternative implementations, the first set of dimensions includes one or more coordinates selected from among x and y coordinates of survey receivers of the survey equipment, and x and y coordinates of survey sources of the survey equipment.

In further or alternative implementations, the at least one input criterion specifies that greater weight is to be placed on one of the dimensions in the second set over another dimension in the second set.

In further or alternative implementations, the dimensions of the second set are associated with respective weights.

In further or alternative implementations, the at least one processor is to identify one or more target positions at which the processed data is to be produced based on the at least one input criterion, wherein the identifying is based on minimizing differences between target values of the dimensions in the second set and corresponding values calculated from the dimensions of the first set, wherein the differences are weighted by the corresponding weights.

In further or alternative implementations, the processing relates to a particular application, and wherein the received at least one criterion is based on the particular application.

In further or alternative implementations, the received at least one criterion is based on a user-provided privilege indicia.

Other or alternative features will become apparent from the following description, from the drawings, and from the claims.

BRIEF DESCRIPTION OF THE DRAWINGS

Some embodiments are described with respect to the following figures.

DETAILED DESCRIPTION

Figure 1:
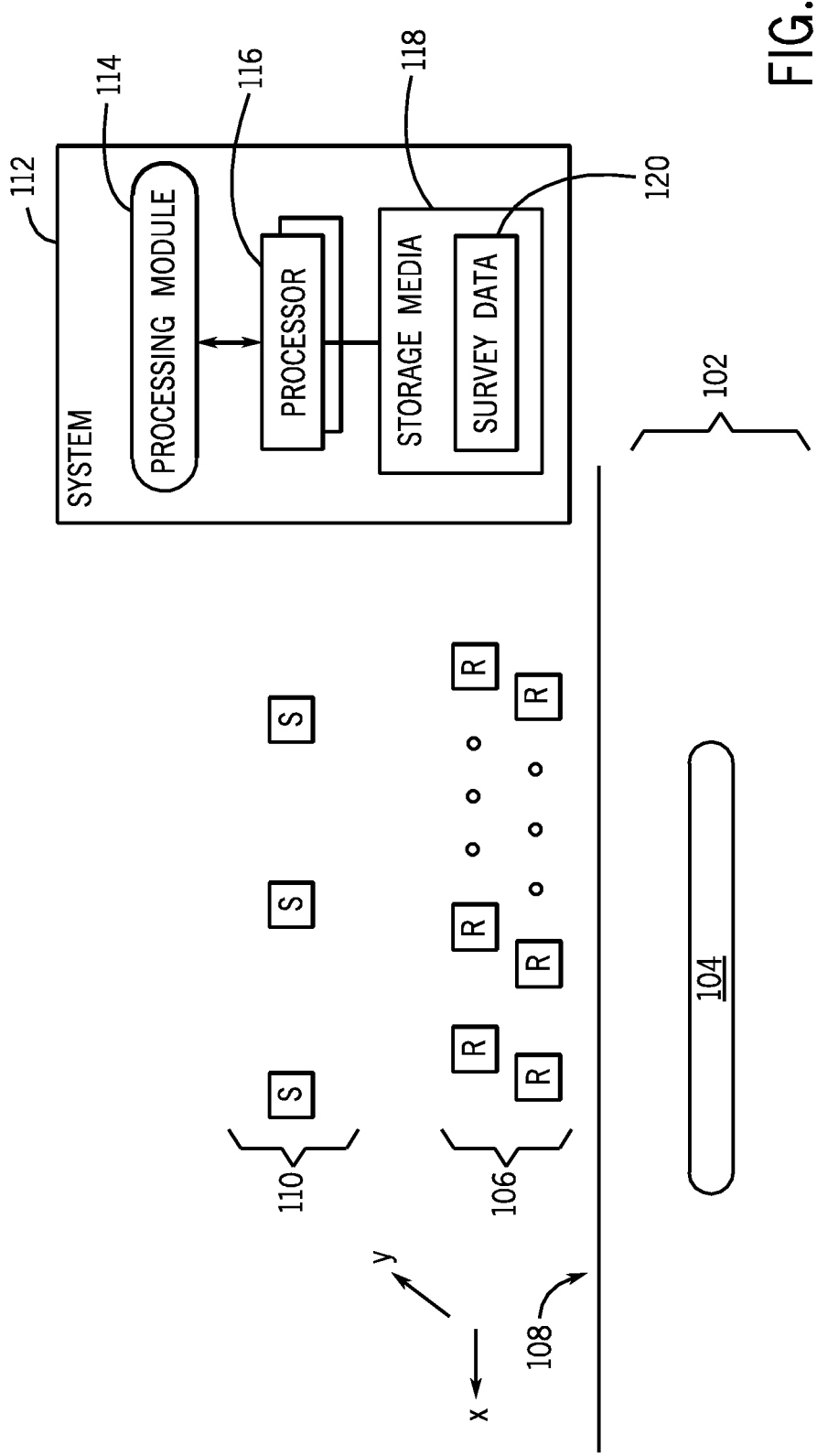
FIG. 1 illustrates an example arrangement to perform a survey of a subterranean structure, according to some implementations.

An arrangement of survey sources and survey receivers is associated with a source geometry and a receiver geometry. The source geometry defines positions of the survey sources, while the receiver geometry defines positions of survey sensors.

Typically, due to economic and technical reasons, the survey geometry (including the source geometry and receiver geometry) is not ideal for purposes of creating an image (representation) of a subterranean structure, or for other purposes. In many survey acquisitions, the survey source and receiver positions are sampled relatively coarsely and irregularly. The positions of survey sources are usually coarser than positions of survey receivers (where "coarser" means that distances between survey sources are typically larger than distances between survey receivers).

The non-ideal survey geometry can result in irregularities in the imaging domain, which is the domain in which an imaging workflow is applied to produce an image of the subterranean structure based upon the collected survey data. Often, the image of the subterranean structure is a three-dimensional (3D) image. The imaging workflow includes analysis tasks performed to invert and migrate survey data into properties that describe the subterranean structure. Although reference is made to imaging workflows in the ensuing discussion for producing images, it is noted that techniques or mechanisms according to some embodiments are also applicable to other types of workflows, such as workflows to remove multiples in survey data (where "multiples" refer to survey data collected due to reflections of survey waves from various surfaces, such as an air-water interface, a land surface, a seafloor, etc.).

To address non-ideal survey geometries, conventional techniques employ interpolation in the imaging domain, which is the domain where the imaging workflow is applied. In some examples, the imaging domain includes the midpoint-offset-azimuth domain. The midpoint refers to the midpoint between a pair of a survey source and a survey receiver. The offset refers to the distance between a pair of a survey source and a survey receiver. The azimuth refers to the orientation of a line connecting a pair of a survey source and a survey receiver, as measured from a reference axis. In other examples, an imaging domain can have different dimensions along other axes. Often, interpolation techniques that apply interpolation in the imaging domain may be sub-optimal.

In accordance with some embodiments, rather than perform interpolation in the imaging domain, interpolation can be instead performed in the acquisition domain. The acquisition domain defines the dimensions of survey equipment, including survey sources and survey receivers, used to collect survey data relating to a subterranean structure.

Generally, techniques or mechanisms according to some embodiments are able to determine target positions in the acquisition domain at which survey data is to be interpolated (or otherwise processed). Once such target positions are determined, interpolation (or other processing) can be performed to produce interpolated (or other processed) survey data at the target positions in the acquisition domain. Survey data, including the interpolated (or other processed) survey data at the target positions, can be mapped into the imaging domain, where an imaging workflow can use the mapped survey data to produce an image of a subterranean structure. More generally, survey data, including the interpolated (or other processed) survey data at the target positions, can be mapped into a processing domain, where a workflow (e.g. imaging workflow, workflow to remove multiples, etc.) can use the mapped survey data to produce an output.

The determined target positions at which survey data is to be interpolated (or otherwise processed) are the positions that are likely to produce a more optimal sampling or distribution of data in the imaging domain (or other processing domain), to allow for a higher quality output to be produced (by the imaging workflow or other workflow) and/or to achieve a lower cost workflow.

In the ensuing discussion, reference is made to interpolation of data at target positions determined using techniques or mechanisms according to some embodiments. In other implementations, the determined target positions can be used for other purposes, such as for designing a survey operation, and so forth.

The foregoing refers to processing of data in the acquisition domain. Note also that "processing" of data can alternatively refer to processing of data in an imaging domain (or other target processing domain) to produce result data, or processing of data in any other domain.

Generally, a tool can be provided that is able to determine target positions in the acquisition domain at which survey data is to be processed. The determination of the target positions is based on at least one input criterion received by the tool, where the at least one input criterion can be input by a user or from another source. In some examples, the specific application which uses the output of the tool can determine the at least one criterion used by the tool to identify the target positions in the acquisition domain at which survey data is to be processed. Further example criteria are discussed further below.

Also, in the ensuing discussion, the acquisition domain is assumed to include four dimensions: (1) in-line coordinate of the survey source, (2) cross-line coordinate of the survey source, (3) in-line coordinate of the survey receiver, and (4) cross-line coordinate of the survey receiver. Note that the time dimension is implicit and can be omitted in this discussion. In a survey acquisition arrangement in which either the survey sources or survey receivers (or both) are moved along a particular direction, the in-line direction refers to the direction of movement. The cross-line direction is generally perpendicular to the in-line direction. Movement of survey sources and/or survey receivers is typically done in marine survey operations, where a surface vessel tows the survey sources and/or survey receivers through a body of water. In land-based survey operations according to some embodiments, the positions of survey sources and survey receivers during the survey operations are often fixed for at least a portion of the survey operation. In such implementations, the in-line direction can be arbitrarily picked, with the cross-line direction designated as being a direction that is generally perpendicular to the in-line direction.

More generally, the four dimensions of the acquisition domain can be defined as: (1) x coordinate of the survey source, (2) y coordinate of the survey source, (3) x coordinate of the survey receiver, and (4) y coordinate of the survey receiver, where the x axis is generally perpendicular to the y axis. Nevertheless, in some embodiments, one or more respective x and y axes may be configured to form an acute angle for one or more of the corresponding survey sources and receivers when the area to be surveyed warrants such an arrangement. In alternate embodiments, one or more respective x and y axes may be configured to form an oblique angle for one or more of the corresponding survey sources and receivers when the area to be surveyed warrants such an arrangement. In other examples, other acquisition domains can be used. In the ensuing discussion, the in-line coordinate and x coordinate are used interchangeably, while the cross-line coordinate and y coordinate are used interchangeably. Reference to "in-line" and "cross-line" does not necessarily imply movement of survey receivers and/or survey sources; these terms are used generally to refer to any two different directions that are generally perpendicular to each other.

The imaging domain (in which the imaging workflow is applied to produce an image of a subterranean structure) includes different dimensions for the same space represented by the dimensions of the acquisition domain. In some implementations, the imaging domain is the midpoint-offset-azimuth domain that is assumed to be a function of the following four dimensions: (1) in-line coordinate of the midpoint between a pair of a survey source and a survey receiver, (2) cross-line coordinate of the midpoint between a pair of survey source and a survey receiver, (3) offset between a pair of a survey source and a survey receiver, and (4) azimuth of the line connecting a pair of a survey source and a survey receiver. Note that alternative axes can be employed in other types of imaging domains.

Although the ensuing discussion refers to an acquisition domain and an imaging domain based on the foregoing dimensions, it is noted that techniques or mechanisms according to some embodiments can be applied to other purposes, as well as other types of acquisition domains and/or processing domains. For example, those with skill in the art will recognize that the disclosed methods can be applied in many fields and contexts where data may be collected and processed for imaging purposes, e.g., medical imaging techniques such as tomography, ultrasound, MRI and the like, SONAR techniques and the like.

FIG. 1 illustrates an example arrangement of a survey system to collect and process survey data of a subterranean structure 102. The subterranean structure 102 includes one or more subterranean elements 104 of interest, where a subterranean element of interest can include a subterranean reservoir, such as a reservoir containing hydrocarbons, freshwater, injected gas, and so forth.

As shown in FIG. 1, an array of survey receivers 106 is provided at or above an earth surface 108 above the subterranean structure 102. In some examples, the survey receivers 106 can be in a two-dimensional array, although other geometries of the survey receivers can be used. The survey system also includes an arrangement of survey sources 110, which can be arranged as a one-dimensional or two-dimensional array of survey sources (or some other arrangement of survey sources). The survey receivers 106 can be seismic or EM survey receivers, while the survey sources can be seismic or EM survey sources.

In the example of FIG. 1, two axes are depicted, including an x axis and a y axis.

FIG. 1 also shows a control system 112 that includes a processing module 114 executable on one or multiple processors 116. The processor(s) 116 is (are) connected to storage media 118, which can store survey data 120 collected by the survey receivers 106.

In operation, one or more survey sources (110) can be activated, which produces corresponding survey signals (e.g. seismic signals) that are propagated into the subterranean structure 102. The survey signals are reflected or affected by subterranean elements in the subterranean structure 102. The reflected or affected survey signals are detected by one or more survey receivers (106) as survey data, which can be provided to the control system 112 (over a wired or wireless communications link) for storage as survey data 120 in the storage media 118.

Figure 2:
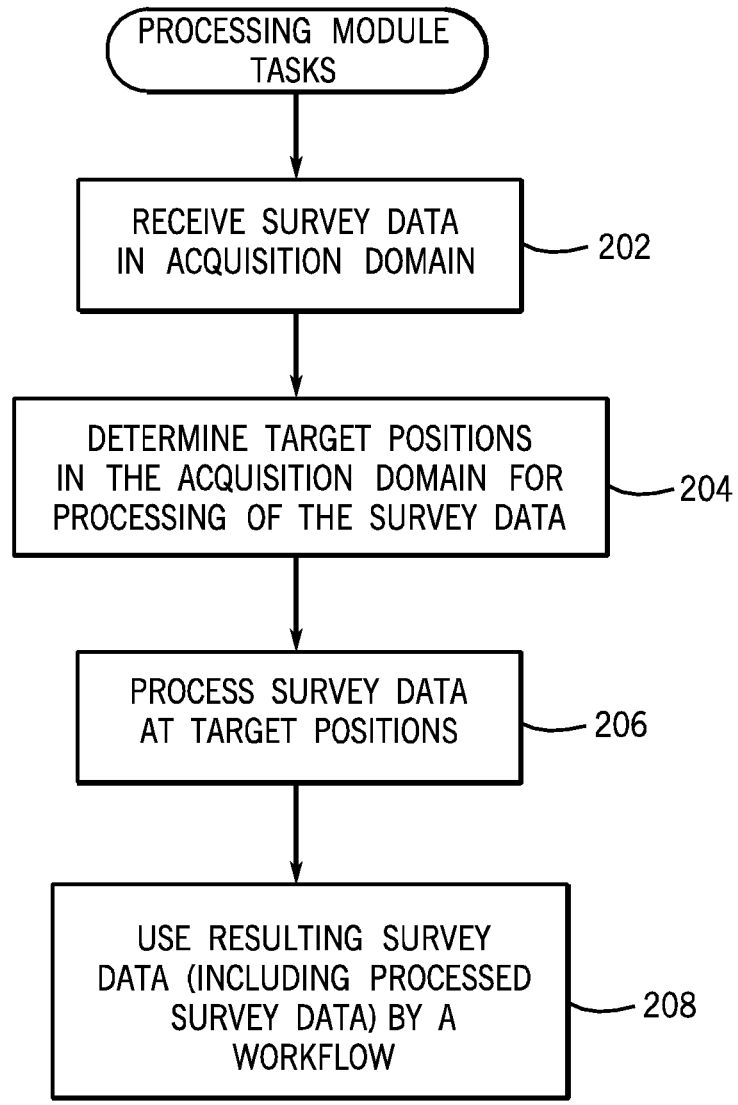
FIG. 2 is a flow diagram of a process relating to processing of survey data, according to some embodiments.

The processing module 114 can apply processing with respect to the survey data 120 using techniques according to some embodiments. FIG. 2 is a flow diagram of a process that can be performed by the processing module 114 in accordance with some implementations.

As depicted in FIG. 2, the processing module 114 receives (at 202) survey data 120 acquired by the survey system of FIG. 1, where the survey data 120 is acquired in an acquisition domain having a first set of dimensions. The acquisition domain includes the (in-line and cross-line) coordinates of the various survey sources and survey receivers.

The processing module 114 next determines (at 204), in response to at least one input criterion, target positions in the acquisition domain for processing (e.g. interpolation) of the survey data 120. The at least one input criterion can include one or more criterion specifying whether at least one dimension of the imaging domain (or other processing domain) is privileged, and in some embodiments, whether at least one dimension is non-privileged (an input criterion specifying whether at least one dimension is privileged or non-privileged includes a privilege indicia). In some examples, the at least one of the criterion can specify that particular one or more dimensions of the processing domain are of interest (privileged) for producing processed (e.g. interpolated) survey data for the workflow, while the remaining one or more dimensions of the processing domain are not of interest (non-privileged) for producing processed (e.g. interpolated data) for the workflow. As discussed further below, the at least one input criterion can be expressed in terms of weights assigned to respective ones of the dimensions of the processing domain. Note that the terms "privileged" and "non-privileged" can also indicate relative preference of one dimension in the processing domain as compared to another dimension in the processing domain.

After the target positions are determined, the survey data is processed (e.g. interpolated) (at 206) by the processing module 114 to produce processed (e.g. interpolated) survey data at one or more target positions. Next, the resulting survey data (including the original survey data 120 and the processed survey data produced at 206) can be used (at 208) by a workflow (e.g. imaging workflow or other workflow) in the processing domain to produce an output (e.g. an image of a subterranean structure or other output).

In task 208, the workflow maps the resulting survey data (including the original survey data 120 and the processed survey data at 206) to the processing domain, and then applies an algorithm on the mapped survey data to produce the output. In some implementations, the processing domain can be partitioned into bins, where the "bins" are respective abutting sub-areas or sub-spaces in the processing domain. The resulting survey data (including the original survey data 120 and the processed survey data at 206) can be mapped to respective bins. Each survey trace (where a survey trace refers to recorded survey data) whose coordinates falls within a given bin is nominally associated (mapped) with the coordinates of the center of the given bin. Depending on the size of each of the bins, and on the distance between the actual position of the survey trace and the nominal position associated with each bin, uncertainty and loss of spatial resolution may result if the distances between the actual positions of the survey traces (in the acquisition domain) and the nominal positions of the bins in the processing domain are too large.

By using techniques or mechanisms according to some embodiments, the distances between actual positions (of processed survey data) and the nominal positions of the bins can be reduced to reduce approximation errors resulting from the binning stage (where survey data in the acquisition domain is mapped to bins of the processing domain).

In some implementations, de-aliasing can also be added to the process of FIG. 2. De-aliasing can be applied to the received survey data (received at 202). In the example embodiment of FIG. 2, de-aliasing is performed prior to task 206.

In the absence of alias of the received survey data in the dimensions of the acquisition domain, it is possible to interpolate the survey data to reconstruct the survey traces at the exact centers of the processing bins. However, aliasing can occur. For example, with marine acquisitions, three of the four acquisition dimensions may be subject to spatial aliasing. In some instances, only the in-line dimension of the survey receivers is sampled finely along the in-line direction (and thus is subject to no or little aliasing). The other dimensions (cross-line dimension of survey receivers, in-line dimension of survey sources, and cross-line dimension of survey sources) are often subject to aliasing, because such dimensions are considered to be under-sampled.

To perform de-aliasing, certain interpolation techniques can be applied, where the applied interpolation techniques allow for interpolation of survey data beyond theoretical sampling limitations, at least in the acquisition dimensions associated with the survey receivers. In some implementations, the interpolation to de-alias and the interpolation at 206 are performed as distinct tasks. However, in other implementations, the interpolation to de-alias and the interpolation at 206 can be performed jointly.

In some examples, interpolation techniques that allow for interpolation of survey data beyond theoretical sampling limitations can be achieved by using multicomponent survey measurements, such as the following multicomponent interpolation techniques: MOIP (Multicomponent Optimal Interpolator with Priors), MIMAP (Multicomponent Iterative Method, Interpolation By Matching Pursuit), ODR (Optimal Deghosting and Reconstruction), and so forth. Multicomponent survey measurements are acquired using multicomponent survey equipment that acquires pressure and particle velocity data (or other types of data that include a plurality of measurable values) with in-line components, cross-line components, and vertical components, where "components" refer to survey sources and/or survey receivers.

For example, the MOIP interpolation technique can make use of prior information about a wavefield to allow for interpolation of survey data beyond theoretical sampling limitations.

When processing common shot seismic gathers, with receiver layout being irregularly and coarsely sampled in space, and affected by spatial alias, each of the foregoing multicomponent interpolation techniques can produce a 3D representation of the seismic wavefield generated by the seismic shot, as if the 3D representation was recorded by an ideal layout of receivers, and not affected by spatial alias. A common layout of receivers is deployed over a regular in-line/cross-line 2D grid. Note also the in-line coordinate of the survey sources can be interpolated with any suitable interpolation technique, including without limitation those discussed herein.

By using any suitable multicomponent interpolation technique, including those discussed herein, an increase of information is made available to allow for use in techniques or mechanisms according to some implementations.

In other implementations, other techniques for de-aliasing received survey data can be employed. For example, OIP (optimally interpolated patterns) or other interpolation techniques can be employed if multichannel survey acquisition is not performed.

In the common shot domain, if it is assumed that the arrangement of survey receivers is regular and finely sampled based on application of de-aliasing as discussed above, signal theory states that a measured signal can be reconstructed at any possible position in the survey receiver dimensions. In practice, in this hypothesis, the regularly sampled data contains equivalently the same information of a continuous wavefield before sampling; as a result, the regularly sampled data can be re-sampled at every position.

Consequently, by using the information present in the de-aliased results, a new source-receiver grid can be designed, in order to place at least some of the survey data at the center of respective bins for one or more imaging dimensions.

In fact, given the capability of placing survey data (a virtual receiver) in any position, assuming the source positions are fixed, it is possible to design which receiver positions would be required to get the traces measured at the center of the 2D (in-line and cross-line) midpoint bin, or in the alternative, which receiver positions would be required to get the traces measured with any given azimuth orientation or with any given offset in the processing domain. Once those target positions are identified, it is relatively straightforward to interpolate the survey data and to reconstruct the survey traces at the target positions that are useful to improve the imaging results. In some embodiments, imaging results can be optimized.

Generally, techniques or mechanisms according to some implementations enable a user (or other application) to specify which of the imaging dimensions are privileged by a user or other entity (such as an application) and, based on such input criterion (or criteria), an enhanced acquisition grid can be determined. Such an enhanced grid can be obtained by reducing or minimizing the distance in the processing domain between the interpolating positions and the centers of the bins. In some implementations, a weight is associated to each dimension based on the input criterion (or criteria). For instance, weight 1 is assigned to the privileged dimension and 0 is assigned to the other dimensions; this may generate a grid with the data in the center of the bins in the desired dimension, and less optimally sampled in the others, as an example. The weights can make the problem overdetermined, or underdetermined, depending on how many acquisition dimensions are free of alias, and how many imaging dimensions need to be finely reconstructed.

The following formulation can summarize the problem in two dimensions, where the coordinates $(x_R, y_R)$ of the survey receivers are the output, assuming the dimension of the acquisition domain relating to the survey receivers are not subject to aliasing:

$$[x_R, y_R] = \operatorname*{argmin}_{X_R, Y_R} \sum_{dim} w_{dim} \operatorname{dist}(PosDes_{dim}, PosMeas_{dim}(X_R, Y_R, x_S, y_S)), \quad \text{(Eq. 1)}$$

where:
  x, y represent in-line and cross-line acquisition receiver coordinates, respectively;
  w represents a weight to associate with a respective imaging dimension (the weights (w) can be described as a function of either the target position in the processing domain or the local position in the acquisition domain);

dist(a,b) represents a distance in the imaging dimension between the acquired position in input (b) and the target position in output (a);

S, R represent suffixes to indicate source or receiver, respectively, in the acquisition domain;

dim represents a suffix to scan the imaging dimensions; and $X_R$, $Y_R$ represent actual in-line and cross-line coordinates, respectively, of survey receivers.

Eq. 1 seeks to reduce or minimize (over selected actual in-line and cross-line coordinates of survey receivers, as represented by $X_R$, $Y_R$) the sum of the weighted distances between acquired positions and target positions.

The following case is considered as a practical example of the solution of the system in Eq. 1. It is assumed that both in-line and cross-line receiver dimensions can be interpolated and de-aliased and that it is desirable to obtain the midpoint dimensions in the acquisition domain to reduce errors associated with binning. In this case, the weights associated with the in-line and cross-line midpoint dimensions are set to 1, and the weights associated with the other dimensions (offset and azimuth) in the processing domain are set to 0. The system in Eq. 1 will hence become:

$$[x_R, y_R] = \underset{X_R, Y_R}{\mathrm{argmin}}\left[1\left(x_{mp} - \frac{(X_R - x_S)}{2}\right)^2 + 1\left(y_{mp} - \frac{(Y_R - y_S)}{2}\right)^2 + 0\left\|AZ - \mathrm{atan}\left(\frac{(Y_R - y_S)}{(X_R - x_S)}\right)\right\|^2 + 0\left\|OH - \sqrt{(Y_R - y_S)^2 + (X_R - x_S)^2}\right\|^2\right],$$

where $x_{mp}$ and $y_{mp}$ are the target positions in the in-line and cross-line coordinates, $$\frac{X_R - x_S}{2} \text{ and } \frac{Y_R - y_S}{2}$$

are the calculated midpoints based on actual measurements, AZ represents the desired azimuth, and OH represents the desired offset. In other examples, instead of applying zero to the azimuth and offset dimensions, as in the example above, non-zero weights can be applied for these dimensions. Also, instead of just applying the weights of value 1 or 0, the weights can have other values, such as values between 0 and 1, or any other weight values. The foregoing equation can be solved as follows:

$$\begin{cases} \frac{\partial}{\partial X_R}\left[\left(x_{mp} - \frac{(X_R - x_S)}{2}\right)^2 + \left(y_{mp} - \frac{(Y_R - y_S)}{2}\right)^2\right] = 0, \\ \frac{\partial}{\partial Y_R}\left[\left(x_{mp} - \frac{(X_R - x_S)}{2}\right)^2 + \left(y_{mp} - \frac{(Y_R - y_S)}{2}\right)^2\right] = 0. \end{cases}$$

In this case, the exact solution can be found:

$$\begin{cases} x_R = 2x_{mp} - x_S, \\ y_R = 2y_{mp} - y_S. \end{cases}$$

The target positions $x_R, y_R$ are the determined positions calculated at 204 in FIG. 2. Interpolated survey data is calculated (206 in FIG. 2) at the target positions represented by $x_R$, $y_R$.

By using techniques or mechanisms according to some embodiments, improved workflows that process survey data can be provided. The interpolation of survey data in the acquisition domain at target positions allows for reduced errors when mapping survey data from the acquisition domain to the processing domain. As a result, outputs of enhanced quality can be achieved. Moreover, the techniques or mechanisms according to some embodiments are relatively efficient and simple to implement.

Machine-readable instructions modules described above (including processing module 114 of FIG. 1) are loaded for execution on a processor (such as one or more processors 116 in FIG. 1). A processor can include one or more of any of the following, alone or in combination: microprocessor, microcontroller, processor module or subsystem, programmable integrated circuit, programmable gate array, or any other suitable control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In alternative embodiments, an article includes at least one machine-readable storage medium storing instructions that upon execution cause a system having a processor to receive survey data acquired by survey equipment in an acquisition domain having a first set of dimensions; determine, in response to at least one input criterion, one or more target positions in the acquisition domain for interpolation of the survey data; interpolate the survey data to produce interpolated survey data at the one or more target positions in the acquisition domain; and use the interpolated survey data by a workflow in a processing domain having a second set of dimensions different from the first set of dimensions.

In further implementations, the first set of dimensions includes one or more coordinates selected from the group consisting of x and y coordinates of survey receivers of the survey equipment, and x and y coordinates of survey sources of the survey equipment, and the second set of dimensions includes one or more dimensions selected from the group consisting of midpoint, offset, and azimuth dimensions.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   determining, in response to at least one input criterion, one or more target positions in an acquisition domain for processing of survey data acquired by survey equipment in the acquisition domain having a first set of dimensions;
   processing the survey data to produce processed survey data corresponding to the one or more target positions in the acquisition domain; and
   processing the processed survey data by a workflow in a processing domain having a second set of dimensions different from the first set of dimensions, wherein the at least one input criterion identifies a subset of the second set of dimensions for producing the processed survey data.

2. The method of claim 1, wherein the first set of dimensions in the acquisition domain includes one or more dimensions corresponding to coordinates of one or both of at least one survey source and at least one survey receiver of the survey equipment.

3. The method of claim 2, wherein the coordinates include in-line coordinates and cross-line coordinates.

4. The method of claim 2, wherein the coordinates include x coordinates and y coordinates, the x coordinates defined along a first direction and they coordinates defined along a second direction, wherein the first and second directions are generally perpendicular to each other.

5. The method of claim 1, wherein the second set of dimensions in the processing domain includes one or more of the dimensions selected from the group consisting of midpoint, offset, and azimuth dimensions.

6. The method of claim 1, wherein the processing domain is partitioned into a plurality of bins, and wherein determining the one or more target positions comprises determining at least one target position in the acquisition domain that maps to a target position within each of the bins.

7. The method of claim 1, wherein determining the one or more target positions comprises determining at least one target position associated with one or more of dimensions selected from the group consisting of offsets in the processing domain and azimuths in the processing domain.

8. The method of claim 1, further comprising receiving the at least one input criterion that relates to dimensions in the second set, and wherein the at least one input criterion includes a privilege indicia.

9. The method of claim 8, further comprising associating respective weights with corresponding dimensions in the second set based at least in part on the privilege indicia.

10. The method of claim 1, further comprising de-aliasing the survey data.

11. The method of claim 10, wherein de-aliasing the survey data comprises applying an interpolation technique to the survey data.

12. The method of claim 10, wherein processing the survey data comprises interpolating the survey data to produce interpolated survey data, and wherein processing the processed survey data in the processing domain comprises processing the interpolated survey data by an imaging workflow.

13. A system comprising:
    a storage medium to store survey data collected by survey equipment wherein the survey data is associated with a first set of dimensions; and
    at least one processor to:
       receive at least one input criterion relating to dimensions of a second set that is different from the first set, wherein the at least one input criterion identifies a subset of the second set of dimensions for processing of the survey data;
       process the survey data according to the received at least one input criterion to produce processed data; and
       use the processed data by a workflow in the second set of dimensions to produce a representation of a subterranean structure.

14. The system of claim 13, wherein the first set of dimensions includes one or more coordinates selected from among x and y coordinates of survey receivers of the survey equipment, and x and y coordinates of survey sources of the survey equipment.

15. The system of claim 14, wherein the second set of dimensions includes one or more dimensions selected from the group consisting of midpoint, offset, and azimuth dimensions.

16. The system of claim 13, wherein the at least one input criterion specifies that a weight to be placed on one of the dimensions in the second set is greater than a weight to be placed on another dimension in the second set.

17. The system of claim 16, wherein the dimensions of the second set are associated with the respective weights.

18. The system of claim 17, wherein the at least one processor is to identify one or more target positions at which the processed data is to be produced based on the at least one input criterion, wherein the identifying is based on minimizing differences between target values of the dimensions in the second set and corresponding values calculated from the dimensions of the first set, wherein the differences are weighted by the respective weights.

19. A method comprising:
    receiving at least one input criterion; and
    determining, in response to the at least one input criterion, one or more target positions in an acquisition domain for processing of survey data, wherein the survey data is acquired by survey equipment in the acquisition domain having a first set of dimensions;
    processing the survey data to produce processed survey data corresponding to the one or more target positions in the acquisition domain; and
    processing the processed survey data in a processing domain having a second set of dimensions different from the first set of dimensions, wherein the processing domain is partitioned into a plurality of bins, and wherein determining the one or more target positions comprises determining at least one target position in the acquisition domain that maps to a target position within each of the bins.

20. The method of claim 19, wherein the received at least one criterion identifies a subset of the second set of dimensions for producing the processed survey data.

21. The method of claim 6, wherein the target position within each of the bins is a center of each of the bins.

* * * * *